United States Patent
Ganguly (10) Patent No.: US 9,152,777 B2
(45) Date of Patent: Oct. 6, 2015

(54) ELECTRONIC AUTHENTICATION DOCUMENT SYSTEM AND METHOD

(71) Applicant: Intel Corporation, Santa Clara, CA (US)

(72) Inventor: Arnab Ganguly, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/924,581

(22) Filed: Jun. 23, 2013

(65) Prior Publication Data

US 2014/0380060 A1 Dec. 25, 2014

(51) Int. Cl.
*G06F 21/00* (2013.01)
*G06F 21/31* (2013.01)
*G06F 21/32* (2013.01)

(52) U.S. Cl.
CPC ............ *G06F 21/31* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 2004/0236951 A1* | 11/2004 | Zhao | 713/179 |
| 2005/0227669 A1 | 10/2005 | Haparnas | |
| 2006/0242698 A1 | 10/2006 | Inskeep et al. | |
| 2006/0271787 A1* | 11/2006 | DeYoung et al. | 713/176 |
| 2010/0241850 A1 | 9/2010 | Xiong | |
| 2012/0124370 A1 | 5/2012 | Choi et al. | |
| 2012/0131655 A1 | 5/2012 | Bender et al. | |

OTHER PUBLICATIONS

International Search Report and Written Opinion received for PCT Patent Application No. PCT/US2014/040524, mailed on Sep. 26, 2014, 10 Pages.

* cited by examiner

*Primary Examiner* — Ghazal Shehni
(74) *Attorney, Agent, or Firm* — Alpine Technology Law Group LLC (57) ABSTRACT

In one embodiment a controller comprises logic configured to receive a document copy, wherein the document copy comprises an identifier which uniquely identifies an electronic device and an authentication algorithm logic, generate, with the authentication algorithm logic, a security key for the document copy based on at least one input from the user, transmit the security key to a remote device, and store the document copy and a computer-readable code which uniquely associates the document with the electronic device in a memory. Other embodiments may be described.

25 Claims, 9 Drawing Sheets

ELECTRONIC AUTHENTICATION DOCUMENT SYSTEM AND METHOD

RELATED APPLICATIONS

None.

BACKGROUND

The subject matter described herein relates generally to the field of electronic devices and more particularly to an electronic authentication document system and method which may be implemented using electronic devices.

In common practice people carry physical authentication documents such as passports, driver's licenses, identification cards, etc. Such physical authentication documents can be bulky, duplicative, and may be subject to forgery, mutilation, and deterioration over time. Accordingly systems and techniques to provide an electronic authentication document system and method which may be implemented using electronic devices may find utility.

BRIEF DESCRIPTION OF THE DRAWINGS

The detailed description is described with reference to the accompanying figures.

FIGS. 3-5A are flowcharts illustrating operations in a method to implement an electronic authentication document system and method in accordance with some embodiments.

DETAILED DESCRIPTION

Described herein are exemplary systems and methods to implement an electronic authentication document system and method in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
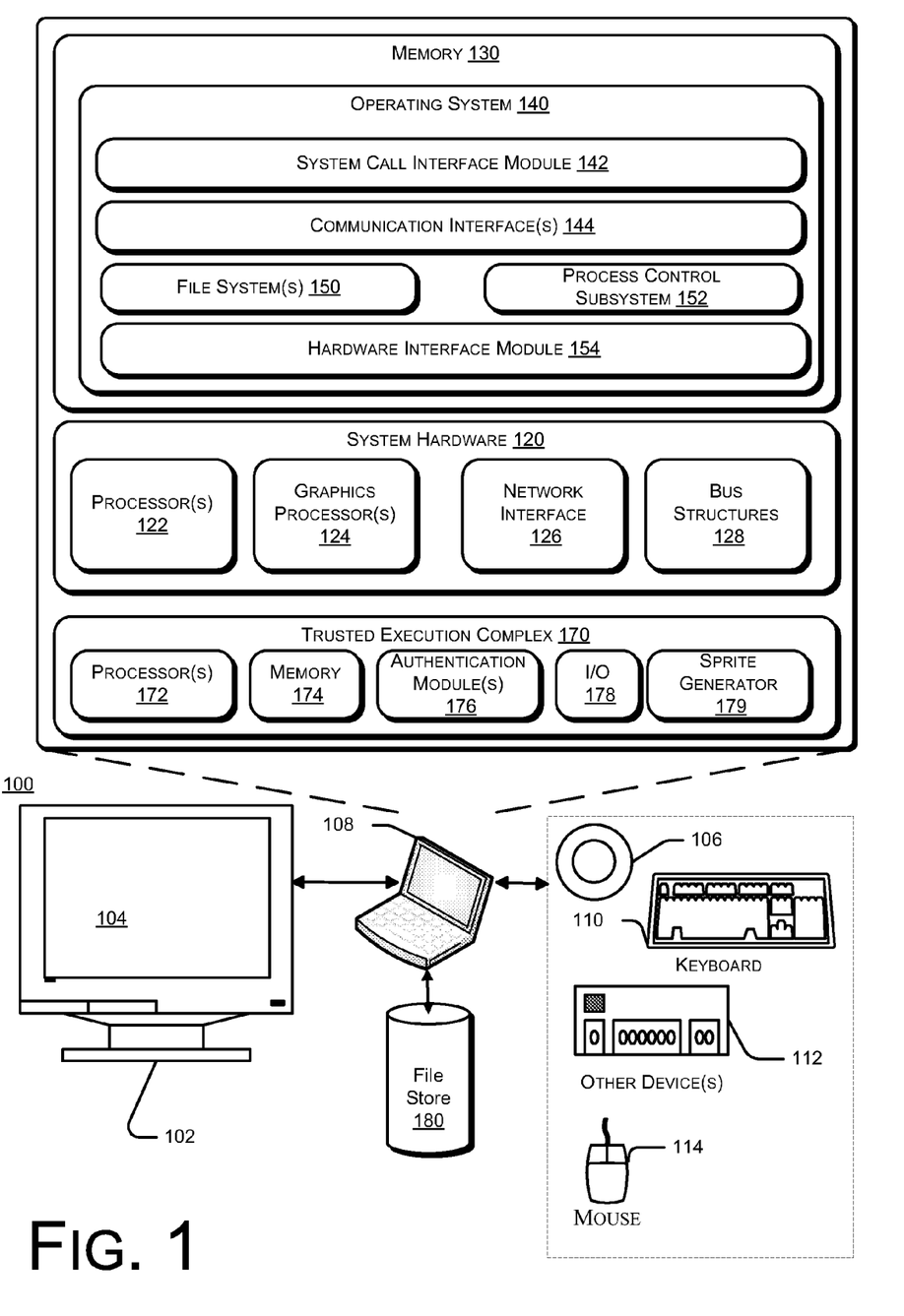
FIGS. 1-2 are schematic illustrations of exemplary electronic devices which may be adapted to implement an electronic authentication document system and method in accordance with some embodiments.

FIG. 1 is a schematic illustration of an exemplary system 100 which may be adapted to implement an electronic authentication document system and method in accordance with some embodiments. In one embodiment, system 100 includes an electronic device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the system 100 to receive input from a user.

In various embodiments, the electronic device 108 may be embodied as a personal computer, a laptop computer, a personal digital assistant, a mobile telephone, an entertainment device, or another computing device. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In some embodiments system 100 may comprise a low-power embedded processor, referred to herein as a trusted execution complex 170. The trusted execution complex 170 may be implemented as an independent integrated circuit located on the motherboard of the system 100. In the embodiment depicted in FIG. 1 the trusted execution complex 170 comprises a processor 172, a memory module 174, an authentication module 176, an I/O module 178, and a secure sprite generator 179. In some embodiments the memory module 164 may comprise a persistent flash memory module and the authentication module 174 may be implemented as logic instructions encoded in the persistent memory module, e.g., firmware or software. The I/O module 178 may comprise a serial I/O module or a parallel I/O module. Because the trusted execution complex 170 is physically separate from the main processor(s) 122 and operating system 140, the trusted execution complex 170 may be made secure, i.e., inaccessible to hackers such that it cannot be tampered with. The secure sprite generator 179 may generate and present an input/output window on a display of the electronic device.

Figure 2:
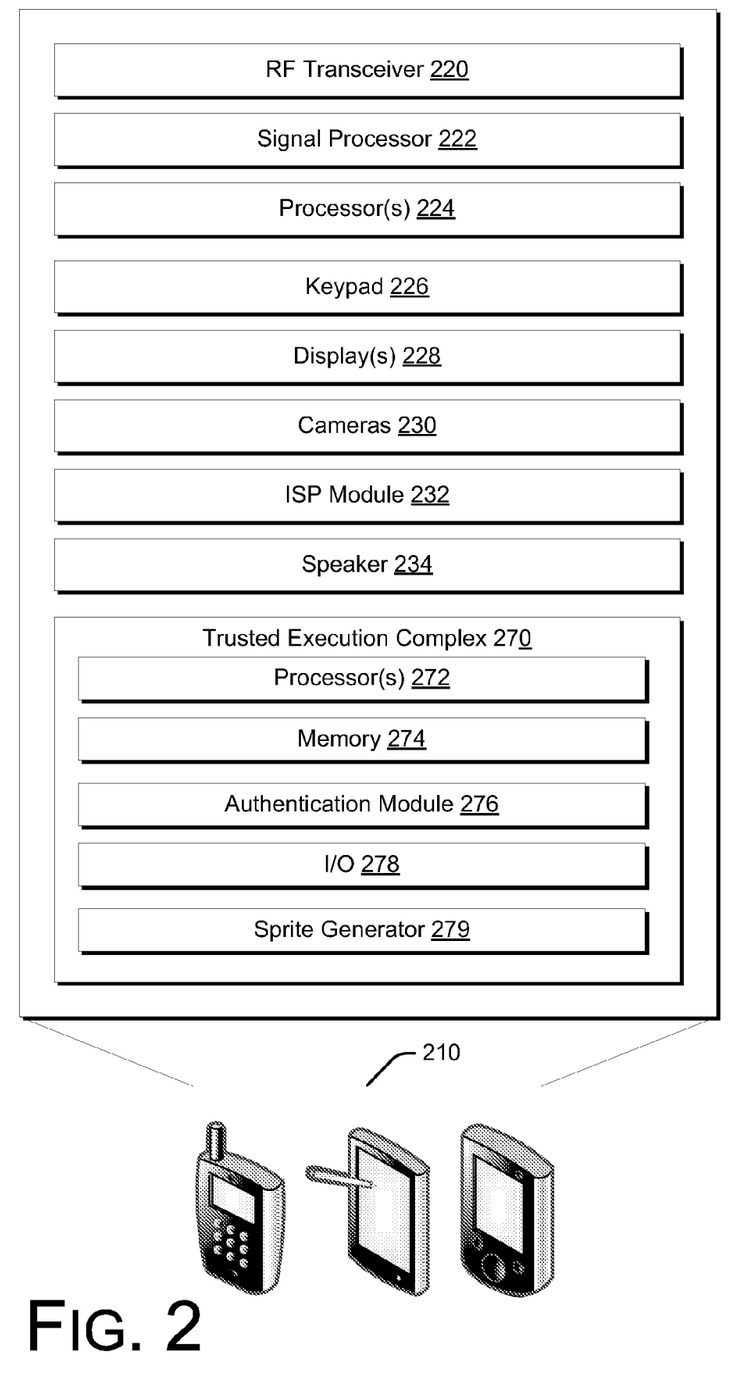

FIG. 2 is a schematic illustration of another embodiment of an electronic device 210 which may be adapted to implement secure image authentication, according to embodiments. In some embodiments electronic device 210 may be embodied as a mobile telephone, a personal digital assistant (PDA), a laptop computer, or the like. Electronic device 210 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 210 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™ ATOM™, and Celeron® processors. Also, one or more processors from other manufactures may be utilized. Moreover, the processors may have a single or multi core design. In some embodiments, memory module 240 includes random access memory (RAM); however, memory module 240 may be implemented using other memory types such as dynamic RAM (DRAM), synchronous DRAM (SDRAM), and the like.

Electronic device 210 may further include one or more input/output interfaces such as, e.g., a keypad 226 and one or more displays 228. In some embodiments electronic device 210 comprises one or more camera modules 230 and an image signal processor 232, and speakers 234.

In some embodiments electronic device 210 may include a trusted execution complex 270 which may be implemented in a manner analogous to that of trusted execution complex 170, described above. In the embodiment depicted in FIG. 2 the trusted execution complex 270 comprises a processor(s) 272, a memory module 274, an authentication module 276, an I/O module 278, and a secure sprite generator 279. In some embodiments the memory module 274 may comprise a persistent flash memory module and the authentication module 276 may be implemented as logic instructions encoded in the persistent memory module, e.g., firmware or software. The I/O module 278 may comprise a serial I/O module or a parallel I/O module. Again, because the trusted execution complex 270 is physically separate from the main processor(s) 224, the trusted execution complex 270 may be made secure, i.e., inaccessible to hackers such that it cannot be tampered with.

In some embodiments the electronic devices 100, 210 depicted in FIGS. 1-2, respectively, may be adapted to implement an electronic authentication document system and method. In the embodiments described herein the respective trusted execution complexes 170, 270 may be used to implement an electronic authentication document system and method. It will be recognized, however, that the main processors(s) 122, 224 of the respective electronic devices 100, 210 may be used to implement an electronic authentication document system and method.

Having described various structures of an electronic authentication document system, operating aspects of a system will be explained with reference to FIGS. 3-5A, which are flowcharts illustrating operations in a method to implement an electronic authentication document system and method in accordance with some embodiments. In some embodiments the operations depicted in the flowchart of FIGS. 3-5A may be implemented by the respective authentication module(s) 172, 272 of the electronic devices 100, 210.

By way of overview, in some embodiments a system implements procedures to generate one or more electronic authentication documents which may be stored electronically in a memory of an electronic device such as the electronic devices depicted in FIGS. 1-2. Corresponding copies of, or at least information relating to, the authentication documents may be stored in one or more memory devices coupled to a communication network. When a holder of an electronic authentication document presents the document for validation the electronic device may cooperate with one or more remote electronic devices to implement security procedures to authenticate the electronic authentication document.

Figure 3:
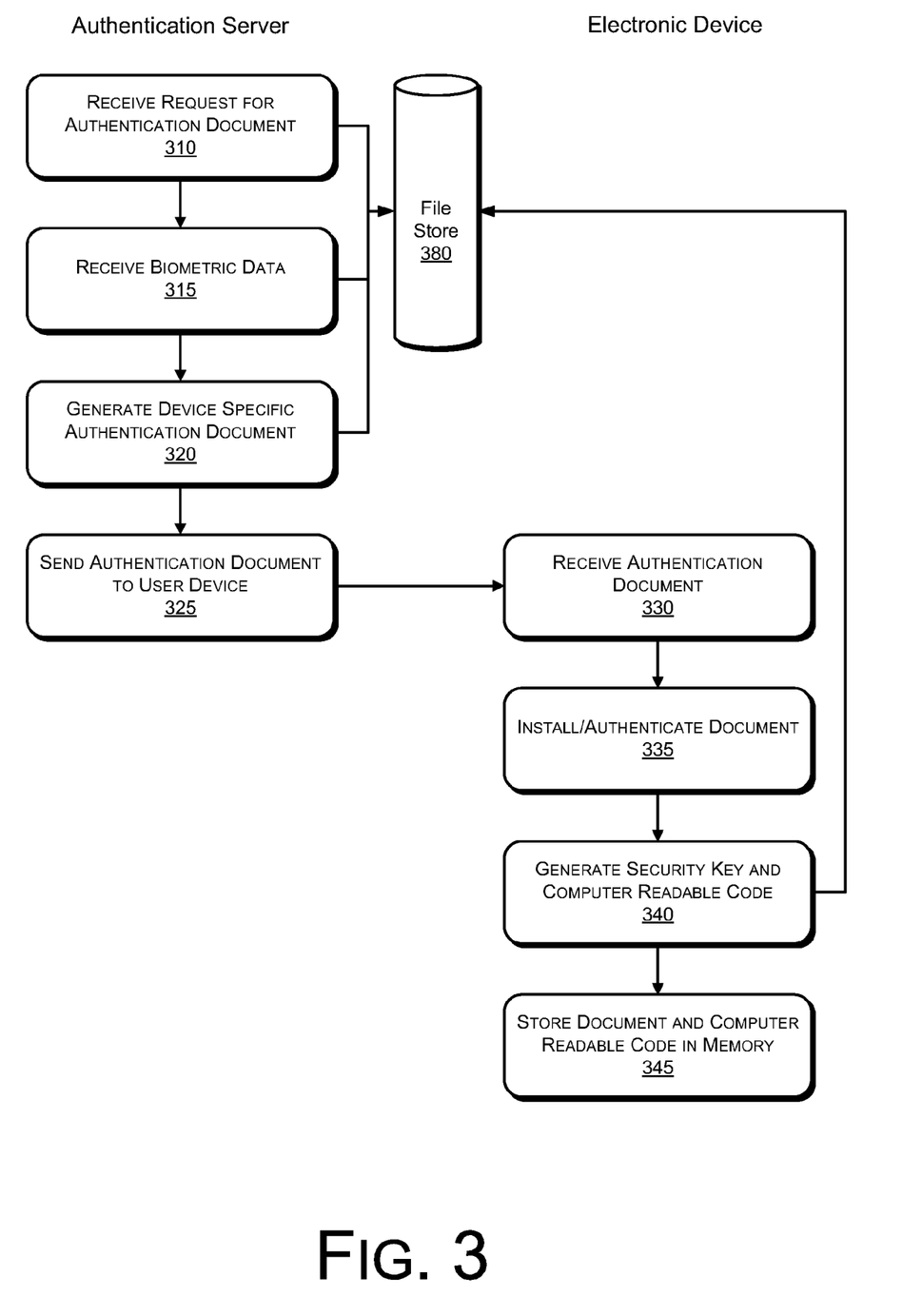

FIG. 3 is a flowchart which illustrates operations implemented during a method to generate an electronic authentication document, according to embodiments. By way of example, an electronic authentication document may be generated by a remote service provider which operates one or more authentication servers which may be coupled to a user electronic device by a suitable communication network, e.g., the Internet.

Referring to FIG. 3, at operation 310 the authentication server receives a request for an electronic authentication document. By way of example, in some embodiments a user of an electronic device may generate a request for an electronic authentication document via an application which executes on the authentication server. In some embodiments the authentication server may collect information which may be used to authenticate the user including, e.g., photographic identification, personal identification information, etc. The authentication server may also collect information which may be used to authenticate the user's electronic device, e.g., the device International Mobile Station Equipment Identity (IMEI) number, device serial number, and device phone number, etc.

In some embodiments a user may provide biometric data with the request. By way of example, in some embodiments a user may be required to provide a fingerprint, retina scan, voice print, or other biometric data with the request. Biometric data may be acquired by the user's electronic device or may be acquired remotely through kiosks or device based remote biometric credential authentication like remote fingerprinting. The authentication server receives (operation 315) the biometric data from the user. The user request and associated information are stored in a file store 380, e.g., a database or other memory structure coupled to the authentication server.

At operation 320 the authentication server generates a device-specific authentication document, which is stored in the file store 380. In some embodiments the electronic authentication document may be embodied as an application which may be installed on the electronic device. The electronic authentication document application may include one or more device identifiers such as the identifiers provided by the user with the request. The device identifiers uniquely identify the electronic device on which the electronic authentication document will be stored. Thus, the electronic authentication document will have a 1:1 correlation with a particular device.

The electronic authentication document application may include a 2-factor authentication algorithm logic module. When executed by a processor on the electronic device the 2-factor authentication logic may require the user to enter a password and 2 factor logic synchronizes with the server to generate a unique code or pattern associated with the electronic authentication document each time the document is opened. The pattern can be visible or invisible.

The electronic authentication document application may include a hologram creation logic module. When executed by a processor on the electronic device the hologram creation logic module may detect a signal and in response to the signal may create LCD pixel colors to generate images which will look like holographic patterns. By way of example, in some embodiments the hologram creation logic module may interface with a camera of an electronic device to detect when the electronic device is exposed to light of a specific wavelength (e.g., UV light) or light which flashes with a specific pattern. In alternate embodiments the hologram creation logic module may interface with a wireless communication capability of the electronic device (e.g., a wireless adapter or a near filed controller NFC)) to detect a signal. In alternate embodiments the hologram creation logic module may interface with in input/output device such as a keyboard or a touch screen to detect a specific input code. The particular interface(s) or signal(s) are not critical.

The electronic authentication document application may include at least portions of the authentication information supplied by the user in operations 310 and 315, e.g., a photograph, personal identification information, and biometric data.

At operation 325 the authentication server sends the authentication document to the user's electronic device. By way of example, the authentication document may be transmitted to the user's device via a suitable communication link, e.g., by a wireless or wired link, or by a suitable communication network, e.g., the Internet or a private network. The specific transmission medium is not critical.

At operation 330 the user's electronic device receives the electronic authentication document, and at operation 335 the electronic authentication document is installed as an application on the device. During the installation process the 2-factor authentication algorithm logic module is invoked and prompts the user to enter a password. The authentication algorithm will then generate (operation 340) a security key for the electronic authentication document, which is synchronized with a corresponding security key on the authentication server. The security key can be keyboard character based or design pattern based. In addition, a computer readable code may be associated with the electronic authentication document. By way of example, the computer readable code may comprise one or more of a bar code, a bit pattern, a screen image, or any other computer readable code.

At operation 345 the user's electronic device stores the electronic authentication document and the associated computer readable code in a memory of the electronic device. Referring back to FIGS. 1-2, in some embodiments the electronic authentication document may be stored in a memory in the trusted execution complex such that the document is not subject to being snooped or tampered by applications which execute on the main processor(s) of the electronic device.

Once the electronic authentication document is stored on the user's electronic device there are multiple ways in which the electronic authentication document can be accessed. By way of example, the electronic authentication document may be accessed by a near field communication (NFC) link, a dock connection through a connector port, e.g., a universal serial bus (USB) connector, a personal area network (PAN), e.g., via a standard Bluetooth connection or an Infrared connection, or a WiFi connection.

Figure 4:
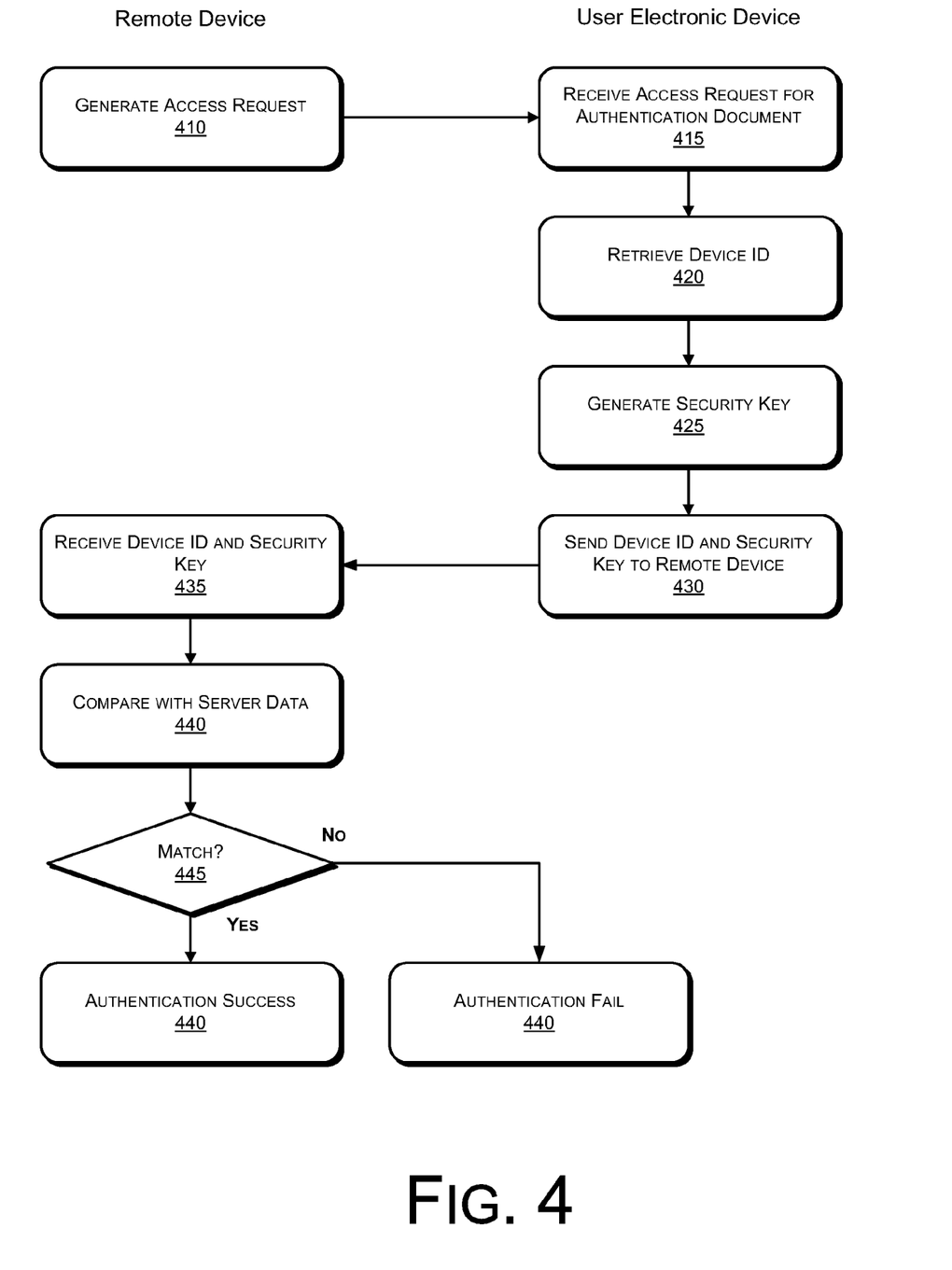

FIG. 4 is a flowchart which illustrates operations implemented during a method to access an electronic authentication document, according to embodiments. By way of example, an electronic authentication document may be accessed in response to a request generated (operation 410) by a remote device such as an electronic document reader. In alternate embodiments a user may generate a request via the secure sprite generator 179/279. The specific origin of the access request is not critical. The remote device may be integrated with or communicatively coupled to the authentication server depicted in FIG. 3.

The user electronic device receives the access request (operation 415) and retrieves (operation 420) one or more of the device identifiers which uniquely identify the electronic device, e.g., the IMEI, serial number, and/or phone number. At operation 425 the 2-factor authentication algorithm logic module is invoked to generate a unique security key, which is sent (operation 430) to the remote device at operation 430. Optionally, the user electronic device may transmit personal identifier data with the device identifier and the security key.

At operation 435 the remote device receives the device identifier and the security key from the user electronic device. At operation 440 the remote device compares the security key and device and/or personal identifier(s) received from the user electronic device with the security key and device and/or personal identifier(s) stored in the file store 380 coupled to the authentication server depicted in FIG. 3. If, at operation 445, the credentials and security key match then the authentication is deemed successful. By contrast, if at operation 445 the credentials and security key do not match then the authentication is deemed unsuccessful.

In some embodiments the authentication procedure may comprise presenting an image of the electronic authentication document on a display device of the user's electronic device for inspection. The inspection may be a visual inspection by a human or an automated inspection process implemented by an electronic reader device. Further, in some embodiments the user electronic device may be configured to present an image, e.g., a holographic image or other image, on the display. Various image characteristics such as the depiction of the image, location of image components, color schemes, etc., may be determined as a function of an output of the 2-factor authentication logic algorithm. This enables the user electronic device to generate a unique image each time the device is activated. In addition, the authentication server may generate a corresponding image as a function of the output of the 2-factor authentication logic algorithm. Comparing the images allows for an additional authentication capability.

Figure 5A:
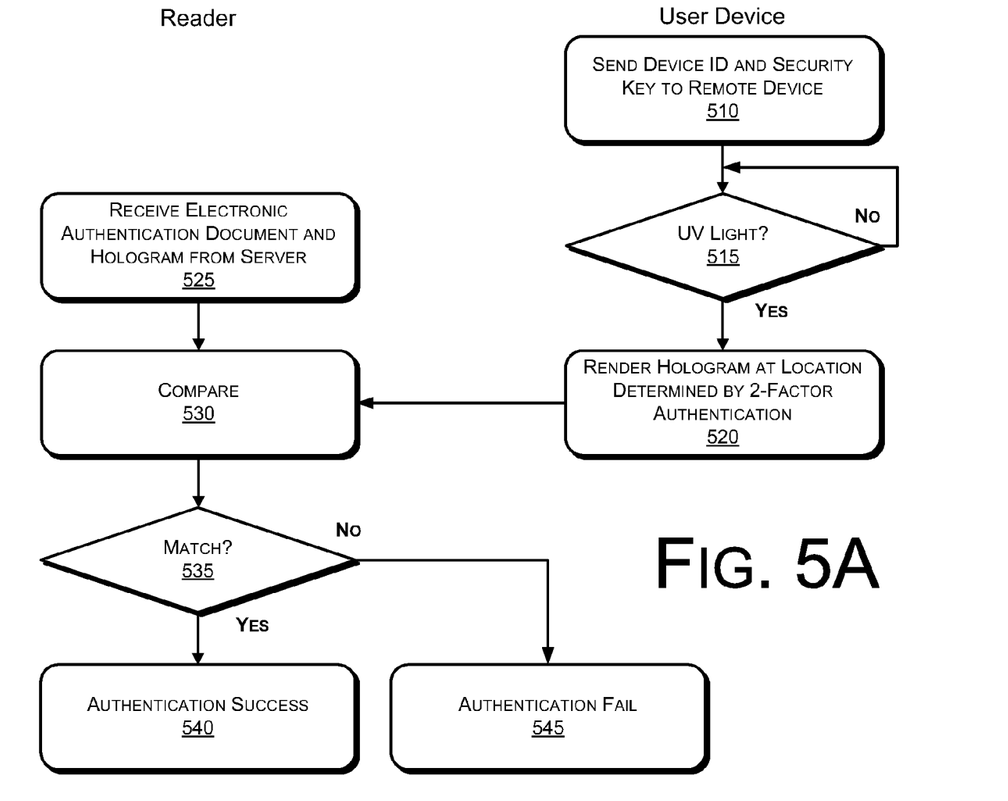
Figure 5B:
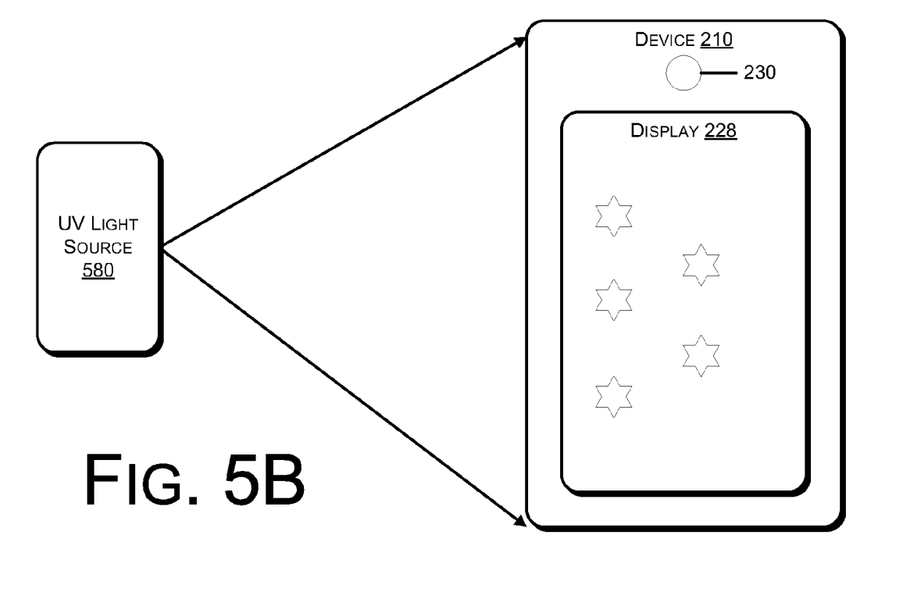
FIG. 5B is a schematic illustration of an operating environment for an electronic authentication document system and method in accordance with some embodiments

FIG. 5A is a flowchart which illustrates operations implemented during a method to present an image on the display in or to facilitate authentication of an electronic authentication document, according to embodiments. FIG. 5B is a schematic illustration of an operating environment for an electronic authentication document system and method in accordance with some embodiments. In the embodiment depicted in FIGS. 5A and 5B, the hologram creation logic module of the electronic authentication document application configures the user device to present an image in response to the detection of a UV light directed at the electronic device. The operations of FIG. 5A may be performed as part of the access process depicted in FIG. 4.

Referring to FIG. 5A, at operation 510 the user electronic device sends one or more device identifiers and an authentication code to a remote device, e.g., an authentication server. At operation 515 the user device monitors the environment to determine whether the device is being exposed to UV light. By way of example, referring to FIG. 5B, in some embodiments the user electronic device 210 may be presented to a card reader which projects UV light from a light source 580 onto the user electronic device 210. The UV light may be detected by an image capture device 230 of the user electronic device 210. As described above, in alternate embodiments the reader may generate a signal using a different medium, e.g., a radio signal or the like.

If, at operation 515, the user device 210 detects that the device 210 is being exposed to UV light then the user device 210 renders a holographic pattern on the display 228 which has at least one characteristic that is determined by an output of the 2-factor authentication algorithm. By way of example, in some embodiments a location of the holographic pattern may be determined by an output of the 2-factor authentication algorithm. The hologram may be visible only in response to UV light. The holographic image may be presented on the display of the user electronic device in combination with the electronic authentication document.

In some embodiments the authentication server executes corresponding hologram creation logic to generate a holographic image using an output of the 2-factor authentication logic algorithm. The authentication server may send a copy of the electronic authentication document and the holographic image to the reader for presentation on a display coupled to or proximate the reader.

At operation 530 the image on the user electronic device 210 and the image presented on a display coupled to or proximate the reader are compared. The comparison may be performed manually or may be performed by logic executing on the reader. If, at operation 535, the images match then a copy of the electronic authentication document and the holographic pattern match then the authentication is deemed successful. By contrast, if at operation 445 the authentication document and the holographic pattern do not match then the authentication is deemed unsuccessful.

Thus, there is described herein an electronic authentication document system and method through which authentication documents, which have traditionally been stored in a physical form, may be stored in electronic form on a user electronic device. Forging, piracy and image duplication may be inhibited using a layered security process.

Level 1 security includes a facial photograph validation on the electronic authentication document. Level 1 security provides basic protection against document misuse in case of a stolen device.

Level 2 security includes validating a 1:1 correlation between the electronic device and the authentication document during installation and authentication. Level 2 security inhibits the distribution and installation of the document to users and devices who are not the intended recipients. By maintaining a 1:1 correlation between the document and the device inhibits the installation and authentication of a tampered document and forgery will be eliminated to a great extent. In the embodiments described herein this may be implemented using the IMEI Number, Phone # and Device Serial #.

Registration of device specific details like IMEI Number or Phone # or Device Serial # or a combination of these with the service provider may be required requirement before the electronic authentication document can be downloaded to the device. A user enters one or more credentials like Name, address and other personal details along with his IMEI Number or Phone # or Device Serial # or a combination of these.

During the validity period of the document if a user decides to change or upgrade his device, the user can then download a copy of the same document into a new device by providing the new device id and by following the authentication process described in the document generation section. Even if installation of a tampered document succeeds, during document access and authentication the device id in form of IMEI Number or Phone # or Device Serial # or a combination of these may be cross verified with the information originally submitted during registration. This will immediately show that the document is not being accessed from the device it was intended for.

Level 3 Security includes 2-factor authentication, which protects against attacks which can override Level 1 and Level 2 security checks. The 2-factor authentication algorithm returns a unique code which may be used to generate a unique visible or invisible pattern on the device every time the electronic authentication document is launched. The pattern can consist of a unique internal code, unique shapes, numbers or characters or a combination of these. The 2 factor authentication will be used in case of no visual and visual authentication process as explained earlier.

As described above, the electronic authentication document is installed on the device with a 2 factor authentication algorithm. As part of this algorithm the user will enter a single password while installing the and the second token based authentication is already inbuilt into the application. The unique combination of the user password and token authentication may be used to generate a unique visible or invisible pattern on the device every time the application is launched. The pattern can consist of a unique internal code, unique shapes, numbers or characters or a combination of these.

These can be matched internally within the system or even visually. The document may be considered authenticated if the codes/patters generated by the device and the service provider computer match.

Level 4 Security may comprise a biometric matching process. In some embodiments a user's biometric data may be captured during the first interaction with the authentication server and stored in association within the electronic authentication document at the authentication server. This biometric information of the user stored in the document will be compared with the actual biometric information gathered on site during authentication. Using a multilayered security approach will make it extremely difficult to duplicate the document since the document will be unique to a single device using device identity and will also be unique to a single user using biometric information.

If the device is lost or stolen the electronic authentication document is protected against misuse by the device's standard security processes like logon password, remote wipe and hard disk encryption. Also when the user reregisters the document the two factor authentication logic will resynchronize the pattern so even if the stolen documents are accessed in a verifying system the two factor authentication algorithms will fail and will return a particular pattern or code indicating that this is a stolen or an invalid document.

Figure 6:
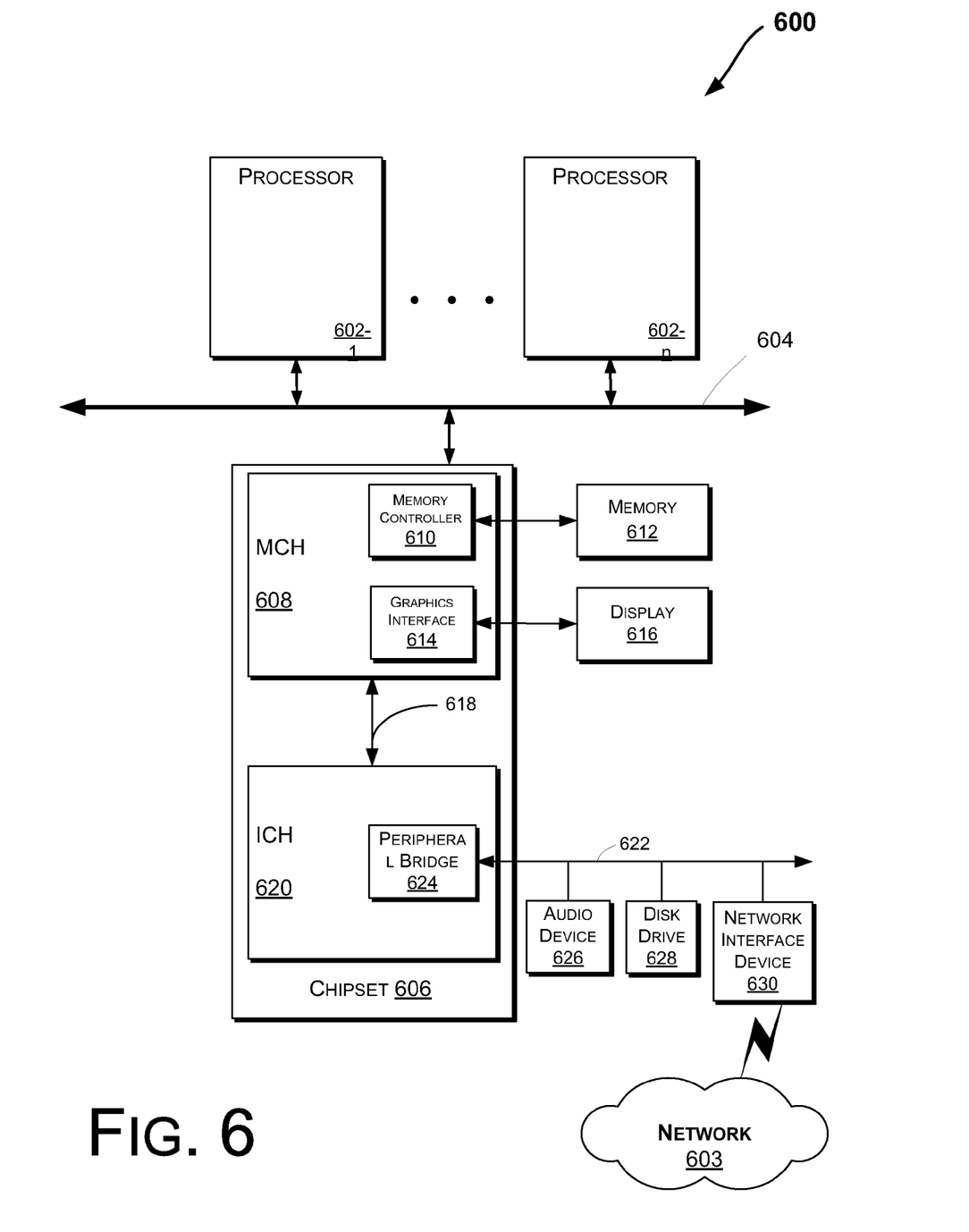
FIGS. 6-9 are schematic illustrations of exemplary electronic devices which may be adapted to implement an electronic authentication document system and method in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
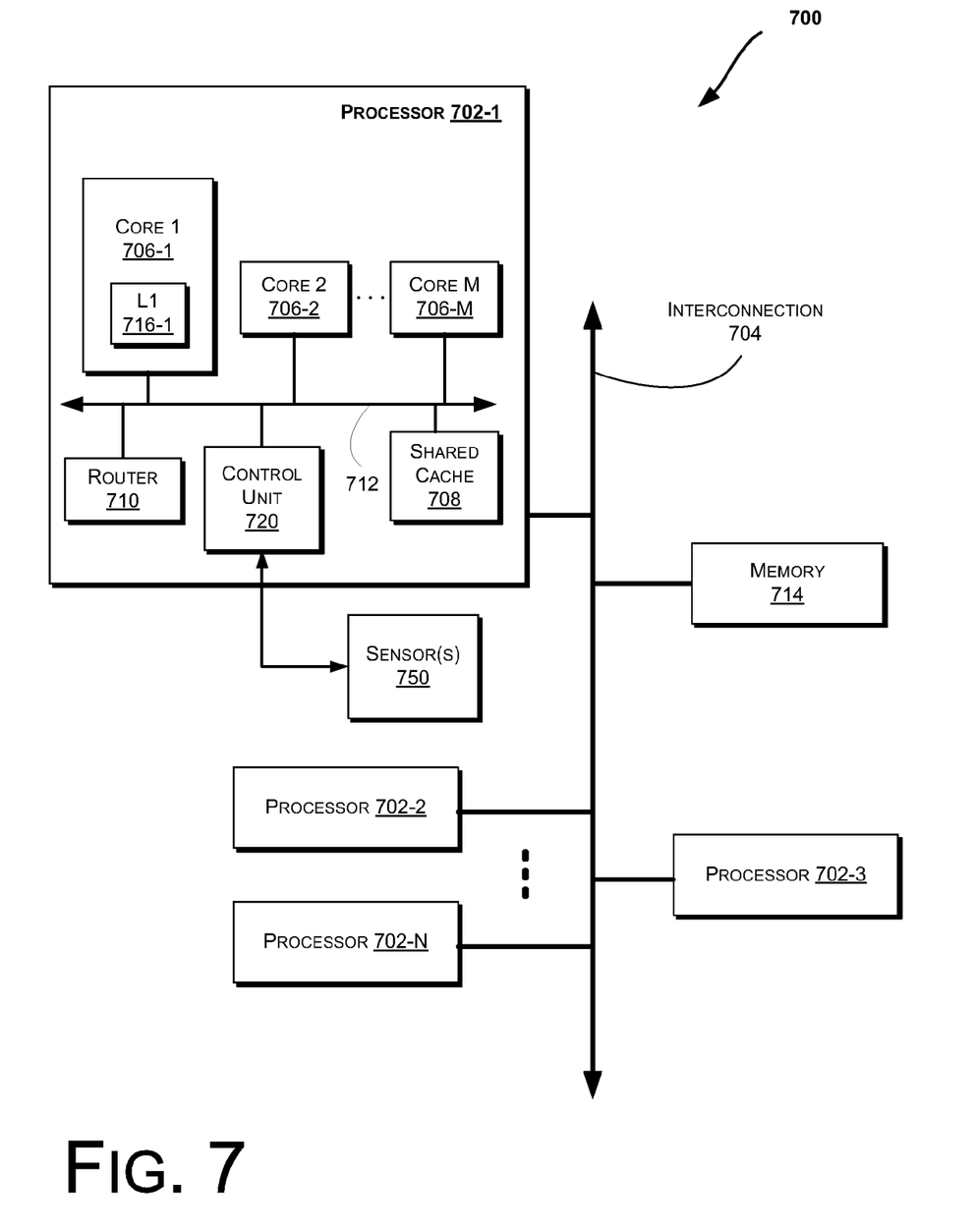

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the controller 720 may include logic to implement the operations described above with reference to FIG. 3.

Figure 8:
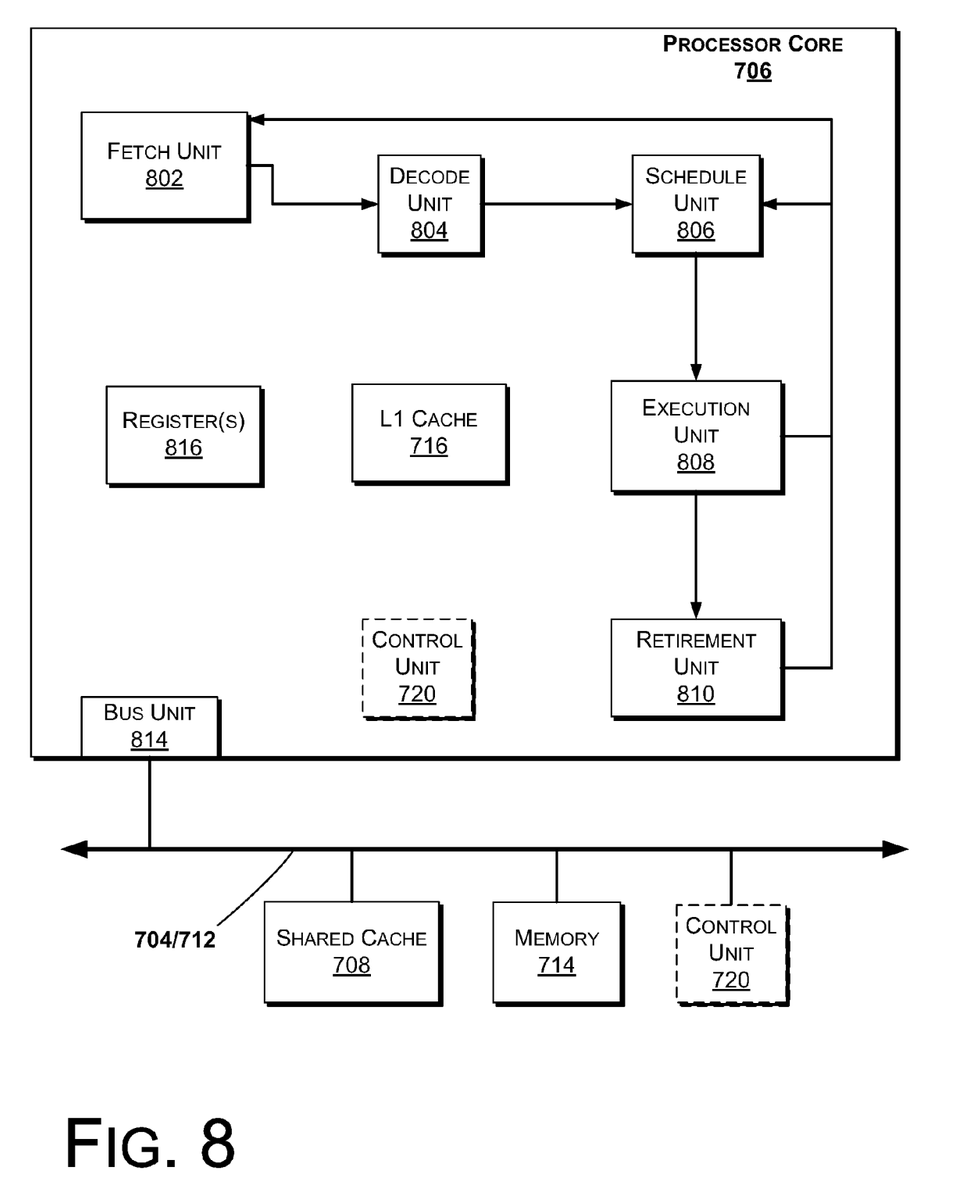

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
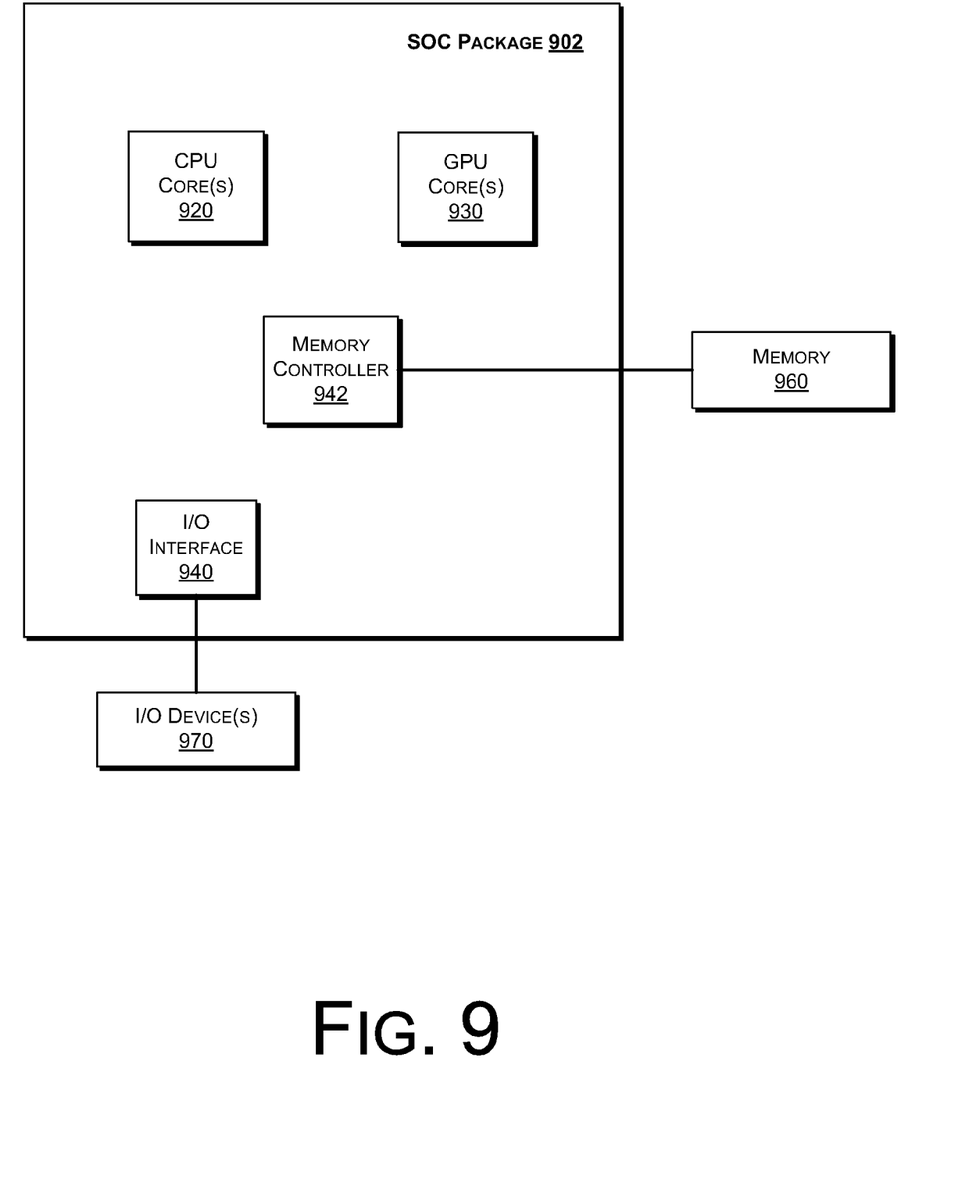

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

The following examples pertain to further embodiments.

Example 1 is a controller, comprising logic configured to receive a document copy, wherein the document copy comprises an identifier which uniquely identifies an electronic device and an authentication algorithm logic generate, with the authentication algorithm, a security key for the document copy based on at least one input from the user, transmit the security key to a remote device and store the document copy and a computer-readable code which uniquely associates the document with the electronic device in a memory.

In example 2 the document copy of claim 1 can optionally include at least one of a photograph of a user of the document copy, a credential of the user of the document copy, and a biometric identifier of the user of the document copy.

In example 3 the controller of claim 1 can optionally include logic configured to authenticate the electronic device.

In example 4 the document copy of claim 1 can optionally include the computer-readable code comprises at least one device identifier which uniquely identifies the device and at least one user credential.

In example 5 the controller of claim 1 can optionally include logic that is configured to receive a request to access the document copy, generate an authentication code for the document copy and present an image of the document copy on a display, wherein the image comprises the computer-readable code.

In example 6 the controller of claim 1 can optionally include a hologram logic which, when executed by the controller, configures the controller to detect when the display is exposed to an ultraviolet light source, and in response thereto, to generate a holographic pattern on the display.

In example 7 the controller of claim 1 can optionally include logic is configured to determine a location for the holographic pattern based at least in part on a multifactor authentication algorithm.

Example 8 is an electronic device comprising a display device, a controller comprising logic configured to receive a document copy, wherein the document copy comprises an identifier which uniquely identifies an electronic device and an authentication algorithm logic, generate, with the authentication algorithm, a security key for the document copy based on at least one input from the user, transmit the security key to a remote device, and store the document copy and a computer-readable code which uniquely associates the document with the electronic device in a memory.

In example 9 the document copy of claim 8 can optionally include at least one of a photograph of a user of the document copy, a credential of the user of the document copy and a biometric identifier of the user of the document copy.

In example 10 the electronic device of claim 8 can optionally include logic is configured to authenticate the electronic device.

In example 11 the computer-readable code of claim 8 the computer-readable code can optionally include at least one device identifier which uniquely identifies the device and at least one user credential.

In example 12 the electronic device of claim 8 can optionally be configured to receive a request to access the document copy, generate an authentication code for the document copy, and present an image of the document copy on a display, wherein the image comprises the computer-readable code.

In example 13 the electronic device of claim 12 can optionally include a hologram logic which, when executed by the controller, configures the controller to detect when the display is exposed to an ultraviolet light source, and in response thereto, to generate a holographic pattern on the display, In example 14 the electronic device of claim 13, can optionally include logic configured to determine a location for the holographic pattern based at least in part on a multifactor authentication algorithm.

Example 15 is a computer program product comprising logic instructions stored on a tangible computer readable medium which, when executed by a controller, causes the controller to receive a document copy from a remote device, wherein the document copy comprises an identifier which uniquely identifies an electronic device and an authentication algorithm logic generate, with the authentication algorithm, a security key for the document copy based on at least one input from the user, transmit the security key to a remote device, and store the document copy and a computer-readable code which uniquely associates the document with the electronic device in a memory.

In example 16 the document copy can optionally include at least one of a photograph of a user of the document copy, a credential of the user of the document copy, and a biometric identifier of the user of the document copy.

In example 17 the computer program product of claim 15 can optionally include logic instructions stored on a tangible computer readable medium which, when executed by a controller, cause the controller to authenticate the electronic device.

In example 18 the computer-readable code can optionally include at least one device identifier which uniquely identifies the device and at least one user credential.

In example 19 the computer program product of claim 15 can optionally include logic instructions stored on a tangible computer readable medium which, when executed by a controller, cause the controller to receive a request to access the document copy, generate an authentication code for the document copy; and present an image of the document copy on a display, wherein the image comprises the computer-readable code.

In example 20 the document copy can optionally include a hologram logic which, when executed by the controller, configures the controller to detect when the display is exposed to an ultraviolet light source, and in response thereto, to generate a holographic pattern on the display.

In example 21 the computer program product of claim 20 can optionally include comprising logic instructions stored on a tangible computer readable medium which, when executed by a controller, cause the controller to determine a location for the holographic pattern based at least in part on a multifactor authentication algorithm.

Example 22 is a processor-based method to manage electronic authentication documents, comprising receiving a document copy, wherein the document copy comprises an identifier which uniquely identifies an electronic device and an authentication algorithm logic, generating, with the authentication algorithm logic, a security key for the document copy based on at least one input from the user, transmitting the security key to a remote processing device, and store the document copy and a computer-readable code which uniquely associates the document with the electronic device in a memory.

In example 23 the document copy can optionally include at least one of a photograph of a user of the document copy, a credential of the user of the document copy, and a biometric identifier of the user of the document copy.

In example 24 the method of claim 22 can optionally include logic configured to authenticate the electronic device.

In example 25 the method of claim 22, can optionally include logic configured to receive a request to access the document copy, generate an authentication code for the document copy, and present an image of the document copy on a display, wherein the image comprises the computer-readable code.

Example 26 is a controller comprising means to receive a document copy, wherein the document copy comprises an identifier which uniquely identifies an electronic device and an authentication algorithm logic, generate, with the authentication algorithm, a security key for the document copy based on at least one input from the user, transmit the security key to a remote device, and store the document copy and a computer-readable code which uniquely associates the document with the electronic device in a memory.

In example 27 the document copy can optionally include at least one of a photograph of a user of the document copy, a credential of the user of the document copy, and a biometric identifier of the user of the document copy.

In example 28 the controller of claim 26 can optionally include means to authenticate the electronic device.

In example 29 the computer-readable code of claim 26 can optionally include at least one device identifier which uniquely identifies the device and at least one user credential.

In example 30 the controller of claim 26 can optionally include means to receive a request to access the document copy, generate an authentication code for the document copy, and present an image of the document copy on a display, wherein the image comprises the computer-readable code.

In example 31 the document copy of claim 30 can optionally include a hologram logic which, when executed by the controller, configures the controller to detect when the display is exposed to an ultraviolet light source, and in response thereto, to generate a holographic pattern on the display.

In example 32 the controller of claim 31 can optionally include means to determine a location for the holographic pattern based at least in part on a multifactor authentication algorithm.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
   logic, at least partially including hardware logic, configured to:
   receive an electronic document copy, wherein the electronic document copy comprises an identifier which uniquely identifies an electronic device and an authentication algorithm logic;
   generate, with the authentication algorithm received with the electronic document copy, a security key for the electronic document copy based on at least one input from a user;
   transmit the security key to a remote device; and
   store the electronic document copy and a computer-readable code which uniquely associates the electronic document copy with the electronic device in a memory.

2. The controller of claim 1, wherein the electronic document copy comprises at least one of:
   a photograph of the user of the document copy;
   a credential of the user of the document copy; and
   a biometric identifier of the user of the document copy.

3. The controller of claim 1, wherein the logic is configured to authenticate the electronic device.

4. The controller of claim 1, wherein the computer-readable code comprises at least one device identifier which uniquely identifies the device and at least one user credential.

5. The controller of claim 1, wherein the logic is configured to:
   receive a request to access the electronic document copy,
   generate an authentication code for the electronic document copy; and
   present an image of the electronic document copy on a display, wherein the image comprises the computer-readable code.

6. The controller of claim 5, wherein the electronic document copy comprises a hologram logic which, when executed by the controller, configures the controller to:
   detect when the display is exposed to an ultraviolet light source, and in response thereto, to generate a holographic pattern on the display.

7. The controller of claim 6, wherein the logic is configured to:
   determine a location for the holographic pattern based at least in part on a multifactor authentication algorithm.

8. An electronic device, comprising:
   a display device;
   a controller comprising:
   logic, at least partially including hardware logic, configured to:

receive an electronic document copy, wherein the electronic document copy comprises an identifier which uniquely identifies an electronic device and an authentication algorithm logic;

generate, with the authentication algorithm received with the electronic document copy, a security key for the document copy based on at least one input from a user;

transmit the security key to a remote device; and store the document copy and a computer-readable code which uniquely associates the electronic document copy with the electronic device in a memory.

9. The electronic device of claim 8, wherein the electronic document copy comprises at least one of:

a photograph of the user of the electronic document copy;

a credential of the user of the electronic document copy; and a biometric identifier of the user of the electronic document copy.

10. The electronic device of claim 8, wherein the logic is configured to authenticate the electronic device.

11. The electronic device of claim 8, wherein the computer-readable code comprises at least one device identifier which uniquely identifies the device and at least one user credential.

12. The electronic device of claim 8, wherein the logic is configured to:

receive a request to access the electronic document copy, generate an authentication code for the electronic document copy; and present an image of the electronic document copy on a display, wherein the image comprises the computer-readable code.

13. The electronic device of claim 12, wherein the electronic document copy comprises a hologram logic which, when executed by the controller, configures the controller to:

detect when the display is exposed to an ultraviolet light source, and in response thereto, to generate a holographic pattern on the display.

14. The electronic device of claim 13, wherein the logic is configured to:

determine a location for the holographic pattern based at least in part on a multifactor authentication algorithm.

15. A computer program product comprising logic instructions stored on a non-transitory computer readable medium which, when executed by a controller, causes the controller to:

receive an electronic document copy from a remote device, wherein the electronic document copy comprises an identifier which uniquely identifies an electronic device and an authentication algorithm logic;

generate, with the authentication algorithm received with the electronic document copy, a security key for the electronic document copy based on at least one input from a user;

transmit the security key to a remote device; and store the electronic document copy and a computer-readable code which uniquely associates the electronic document copy with the electronic device in a memory.

16. The computer program product of claim 15, wherein the electronic document copy comprises at least one of:

a photograph of the user of the electronic document copy;

a credential of the user of the electronic document copy; and a biometric identifier of the user of the electronic document copy.

17. The computer program product of claim 15, further comprising logic instructions stored on a non-transitory computer readable medium which, when executed by a controller, cause the controller to authenticate the electronic device.

18. The computer program product of claim 15, wherein the computer-readable code comprises at least one device identifier which uniquely identifies the device and at least one user credential.

19. The computer program product of claim 15, further comprising logic instructions stored on a non-transitory computer readable medium which, when executed by a controller, cause the controller to:

receive a request to access the electronic document copy, generate an authentication code for the electronic document copy; and present an image of the electronic document copy on a display, wherein the image comprises the computer-readable code.

20. The computer program product of claim 15, wherein the electronic document copy comprises a hologram logic which, when executed by the controller, configures the controller to:

detect when the display is exposed to an ultraviolet light source, and in response thereto, to generate a holographic pattern on the display.

21. The computer program product of claim 20, further comprising logic instructions stored on a non-transitory computer readable medium which, when executed by a controller, cause the controller to:

determine a location for the holographic pattern based at least in part on a multifactor authentication algorithm.

22. A processor-based method to manage electronic authentication documents, comprising:

receiving an electronic document copy, wherein the electronic document copy comprises an identifier which uniquely identifies an electronic device and an authentication algorithm logic;

generating, with the authentication algorithm logic received with the electronic document copy, a security key for the electronic document copy based on at least one input from a user;

transmitting the security key to a remote processing device; and store the electronic document copy and a computer-readable code which uniquely associates the document copy with the electronic device in a memory.

23. The method of claim 22, wherein the electronic document copy comprises at least one of:

a photograph of the user of the electronic document copy;

a credential of the user of the electronic document copy; and a biometric identifier of the user of the electronic document copy.

24. The method of claim 22, wherein the logic is configured to authenticate the electronic device.

25. The method of claim 22, wherein the logic is configured to:

receive a request to access the electronic document copy, generate an authentication code for the electronic document copy; and present an image of the electronic document copy on a display, wherein the image comprises the computer-readable code.

* * * * *